United States Patent [19]

Skafvenstedt et al.

[11] 4,318,113

[45] Mar. 2, 1982

[54] PAPER CONVEYING DEVICE FOR A RECORDING UNIT

[75] Inventors: Bengt Skafvenstedt, Stockholm; Sture Ahlgren, Vällingby, both of Sweden

[73] Assignee: Siemens Aktiengesellschaft, Berlin & Munich, Fed. Rep. of Germany

[21] Appl. No.: 122,073

[22] Filed: Feb. 15, 1980

[30] Foreign Application Priority Data

Mar. 14, 1979 [DE] Fed. Rep. of Germany ....... 2910019

[51] Int. Cl.³ ........................ G01D 15/24; B65H 25/26

[52] U.S. Cl. ........................................ 346/136; 226/21

[58] Field of Search .................... 346/136; 226/18, 21; 242/57.1

[56] References Cited

U.S. PATENT DOCUMENTS

| | | | |
|---|---|---|---|
| 3,912,143 | 10/1975 | Miller et al. | 226/21 |
| 4,165,029 | 8/1979 | Mitchell | 346/136 X |

FOREIGN PATENT DOCUMENTS

| | | | |
|---|---|---|---|
| 1057016 | 5/1959 | Fed. Rep. of Germany . | |
| 1080477 | 4/1960 | Fed. Rep. of Germany . | |
| 2407842 | 8/1975 | Fed. Rep. of Germany | 226/21 |
| 2614690 | 10/1977 | Fed. Rep. of Germany . | |

OTHER PUBLICATIONS

Barna, T. B.; Tape Tracking Guide, IBM Technical Disclosure Bulletin, vol. 11, No. 6, Nov. 1968, p. 649.

*Primary Examiner*—George H. Miller, Jr.
*Attorney, Agent, or Firm*—Hill, Van Santen, Steadman, Chiara & Simpson

[57] ABSTRACT

In an exemplary embodiment, a recording unit comprises a support mount for the blank paper, rollers for the guidance and conveying of the paper, and a stylus which writes essentially perpendicularly to the longitudinal direction of the paper. The paper is conducted over a deflection roller. The deflection roller is swingably mounted so as to be angularly shiftable essentially in the longitudinal direction of the paper.

4 Claims, 2 Drawing Figures

PAPER CONVEYING DEVICE FOR A RECORDING UNIT

BACKGROUND OF THE INVENTION

The invention relates to a paper conveying device for a recording unit with a support for the blank paper, with rollers for the guidance and conveying of the writing paper and with a recorder which records essentially perpendicular to the longitudinal direction of the paper as well with at least one deflection roller in the paper conveying path over which the paper is conducted.

A paper conveying device of the above type is known from the German OS No. 2614690. It can easily happen in this known paper conveying device that the paper strip is not precisely aligned with respect to the paper conveying device when the recording unit is loaded with recording paper. This can mean that the recording paper is not supplied in a straight line from the conveying device, which leads to the fact that the curves inscribed on the recording paper are distorted.

SUMMARY OF THE INVENTION

The object of the invention is to create a paper conveying device of the type initially cited in which the recording paper can be righted in its direction of travel.

This object is inventively achieved in that at least one deflection roller is rotatably mounted for angular adjustment approximately in the longitudinal direction of the paper.

In this manner, the deflection roller can always align itself to the drive roller during the feed of the paper. By so doing, the paper is also always aligned in the desired conveying direction so that, in all, a secure drive is guaranteed.

Further details of the invention ensue from the sub claims. The invention is explained in greater detail on the basis of an exemplary embodiment illustrated in the figures on the accompanying sheet of drawings; and other objects, features and advantages will be apparent from this detailed disclosure.

DETAILED DESCRIPTION

Figure 1:
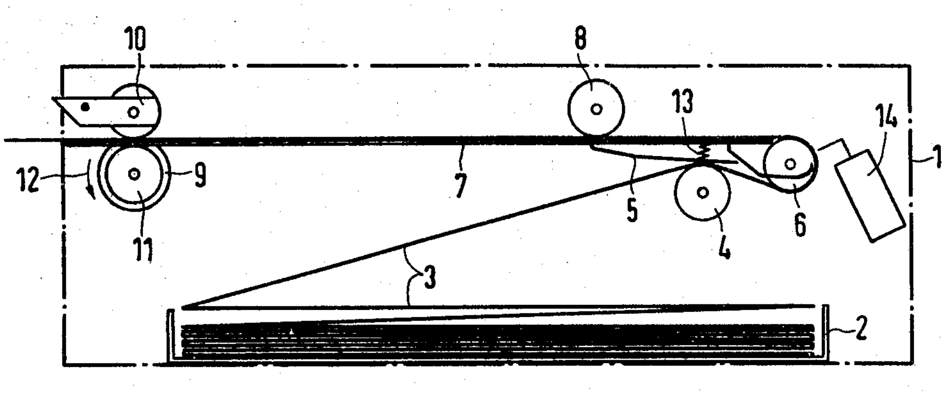
FIG. 1 shows a diagrammatic longitudinal sectional view of a recording unit with an inventive deflection roller.

As shown in FIG. 1, a recording unit 1 is loaded in a support mount 2 with a stack of folded recording paper 3. As viewed in the conveying direction, the paper 3 proceeds from the paper stack first between a brake roller 4 and a pressure plate 5. It is then conducted about a deflection roller 6 and onto a paper table 7 on which it is conducted through a blotting roller 8 for drying the recording and, finally, the paper is conducted through the nip between a roller 9 and a pressure roller 10. The roller 10 is resiliently pressed against the roller 9. The roller 9 serves as the drive roller and is driven in the direction of arrow 12 by means of a motor 11. The pressure plate 5 is resiliently pressed toward the brake roller 4 by means of springs 13. The pressure piece 5 and the brake roller 4 effect that the paper 3 is stretched tight from there until the drive roller 9.

The recording ensues by means of a jet stylus 14 in the area of the deflection roller 6, said stylus writing essentially perpendicular to the longitudinal direction of the paper.

Figure 2:
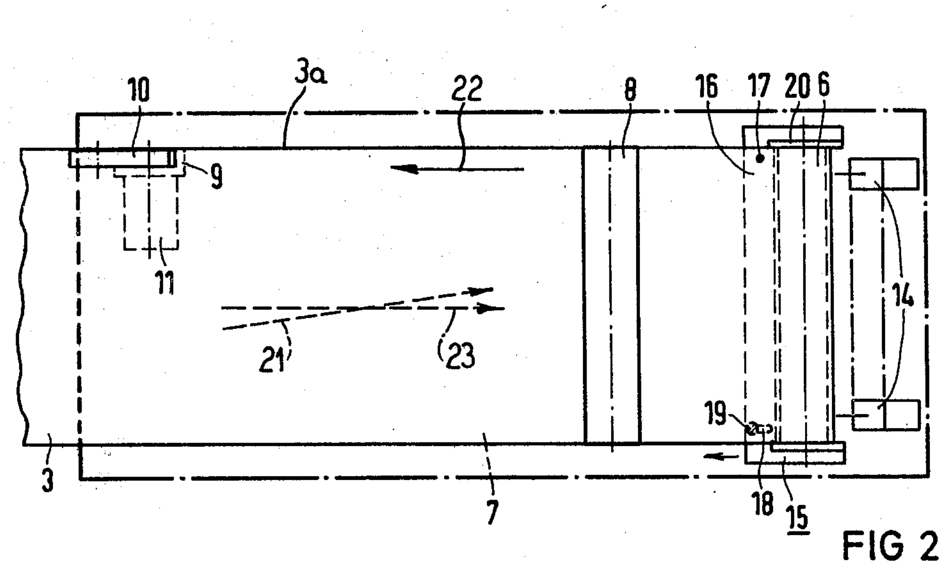
FIG. 2 shows the recording unit with the deflection roller according to FIG. 1 in a diagrammatic top view.

FIG. 2 shows that the deflection roller 6 is supported at a bow 15 which includes a base plate 16 which is rotatably mounted for angular adjustment about an axis 17 at the underside of the paper table 7. The base plate 16 further exhibits a slot 18 curved around the axis of rotation 17, in which slot 18 a fixing screw 19 for arresting the rotatability of the base plate 16 and, thus, of the deflection roller 6 is conducted. So that the bow 15 of the deflection roller 6 is more clearly visible, the brake roller 4 and the pressure plate 5 have not been illustrated in FIG. 2.

Even given a paper insertion which was not proper, such an oblique paper position is always automatically achieved with the above feature via the deflection roller 6 so that the paper 3 proceeds in the prescribed conveying direction. At the end of the bow 15 on the side of the bearing which provides the rotational axis 17, the end face of the deflection roller 6 also exhibits a flange 20 which serves as a reference edge for the recording paper 3. This means that the paper 3 is lightly pressed against the flange due to the oblique position of the deflection roller 6, so that this paper edge is also precisely conducted between rollers 9 and 10.

It will be apparent that many modifications and variations may be effected without departing from the scope of the novel concepts and teachings of the present invention.

We claim as our invention:

1. A paper conveying device for a recording unit with a support mount for the blank paper, with rollers for the guidance and the conveying of the writing paper along a paper conveying path and defining a longitudinal feed axis, and with a recorder which writes essentially perpendicular to the longitudinal feed axis and with at least one deflection roller in the paper conveying path over which the paper is conducted during supply of the paper in a longitudinal direction of the paper, the at least one deflection roller (6) being rotatably mounted for angular movement approximately in the longitudinal direction of the paper, characterized in that the deflection roller (6) has a bow (15) including a base plate (16) which is rotatably mounted for angular movement about a rotational axis (17) and provides a slot (18) curved about the rotational axis (17), said arresting means comprising a fixed screw (19) engagable in said slot.

2. A paper conveying device for a recording unit with a support mount for the blank paper, with rollers for the guidance and the conveying of the writing paper along a paper conveying path and defining a longitudinal feed axis, and with a recorder which writes essentially perpendicular to the longitudinal feed axis and with at least one deflection roller in the paper conveying path over which the paper is conducted during supply of the paper in a longitudinal direction of the paper, the at least one deflection roller (6) being rotatably mounted for angular movement approximately in the longitudinal direction of the paper, said deflection roller (6) having mounting means (15) providing a rotational axis (17) adjacent one end of the deflection roller about which the deflection roller is angularly movable, and said deflection roller having a flange (20) at said one end thereof, and means maintaining said deflection roller at an angle to the longitudinal direction of the paper such that the paper is held against said flange (20) as a reference edge and is guided by said flange to move parallel to said longitudinal feed axis as it leaves said deflection roller in spite of any misalignment of the longitudinal direction of the paper at the support mount.

3. A paper conveying device for a recording unit with a support mount for the blank paper, with rollers for the guidance and the conveying of the writing paper along a paper conveying path and defining a longitudinal feed axis, and with a recorder which writes essentially perpendicular to the longitudinal feed axis and with deflection roller means in the paper conveying path over which the paper is conducted during supply of the paper in a longitudinal direction of the paper, characterized in that said deflection roller means comprises at least one deflection roller (6) rotatably mounted in such a manner that, with respect to a plane of the paper conveying path where the paper leaves the deflection roller (6), said deflection roller (6) moves about an axis of rotation which lies perpendicular to such plane, said deflection roller (6) having a flange (20) at an end thereof, said flange (20) serving as a reference edge for the recorder, and means for stopping rotation of the deflection roller (6) about said axis in such a position that the paper is lightly pressed against the flange (20) as it moves along said paper conveying path.

4. A paper conveying device according to claim 3, characterized in that the deflection roller (6) has a bow (15) including a base plate (16) which is rotatably mounted for angular movement about said axis (17) and provides a slot (18) curved about the axis of rotation (17), a set screw (19) being engagable in said slot.

* * * * *